(12) United States Patent
Stein et al.

(10) Patent No.: US 6,361,068 B1
(45) Date of Patent: Mar. 26, 2002

(54) FOLDED INFLATABLE SIDE CURTAIN WITH TETHER

(75) Inventors: Russell E. Stein, Leonard; Ayad G. Nayef, Auburn Hills, both of MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/576,787

(22) Filed: May 23, 2000

(51) Int. Cl.⁷ .................................................. B60R 21/22
(52) U.S. Cl. ................................... 280/730.2; 280/743.1
(58) Field of Search ........................... 280/730.2, 743.1, 280/743.2, 730.1, 728.2; 53/116, 117, 429

(56) References Cited

U.S. PATENT DOCUMENTS

| | | | |
|---|---|---|---|
| 5,570,900 A | | 11/1996 | Brown |
| 5,588,672 A | * | 12/1996 | Karlow et al. ............ 280/730.2 |
| 5,730,463 A | * | 3/1998 | Fisher et al. ............. 280/743.1 |
| 5,884,937 A | * | 3/1999 | Yamada .................... 280/730.2 |
| 5,899,490 A | | 5/1999 | Wipasuramont et al. |
| 5,960,611 A | | 10/1999 | Aigner et al. |
| 6,073,961 A | * | 6/2000 | Bailey et al. ............ 280/730.2 |
| 6,168,191 B1 | * | 1/2001 | Webber et al. ........... 280/730.2 |
| 6,186,534 B1 | * | 2/2001 | Heinz ...................... 280/728.2 |

* cited by examiner

*Primary Examiner*—J. J. Swann
*Assistant Examiner*—David R. Dunn
(74) *Attorney, Agent, or Firm*—Tarolli, Sundheim, Covell, Tummino & Szabo L.L.P.

(57) ABSTRACT

Apparatus (10) for helping to protect an occupant of a vehicle (12) that has a side structure (16) and a roof (18) includes an inflatable vehicle occupant protection device (14) that is inflatable away from the vehicle roof into a position between the side structure and a vehicle occupant. The inflatable device (14), when inflated, has a perimeter at least partially defined by an upper edge (50), a lower edge (52), and front and rear portions (54 and 56) spaced apart horizontally along the upper and lower edges. An inflation fluid source (24) provides inflation fluid for inflating the inflatable device (14). A flexible elongated member (70) has a first end (72) connected to the inflatable device (14) at a first location (74) on the inflatable device (14) and an opposite second end (80) connected to the vehicle side structure (16) at a second location (82). The inflatable device (14), prior to inflation, is folded along a first fold line (100) such that a lower portion (104) of the device overlies an upper portion (102) of the device and such that the first end (72) of the flexible elongated member (70) is positioned adjacent the upper edge (50) of the inflatable device.

22 Claims, 5 Drawing Sheets

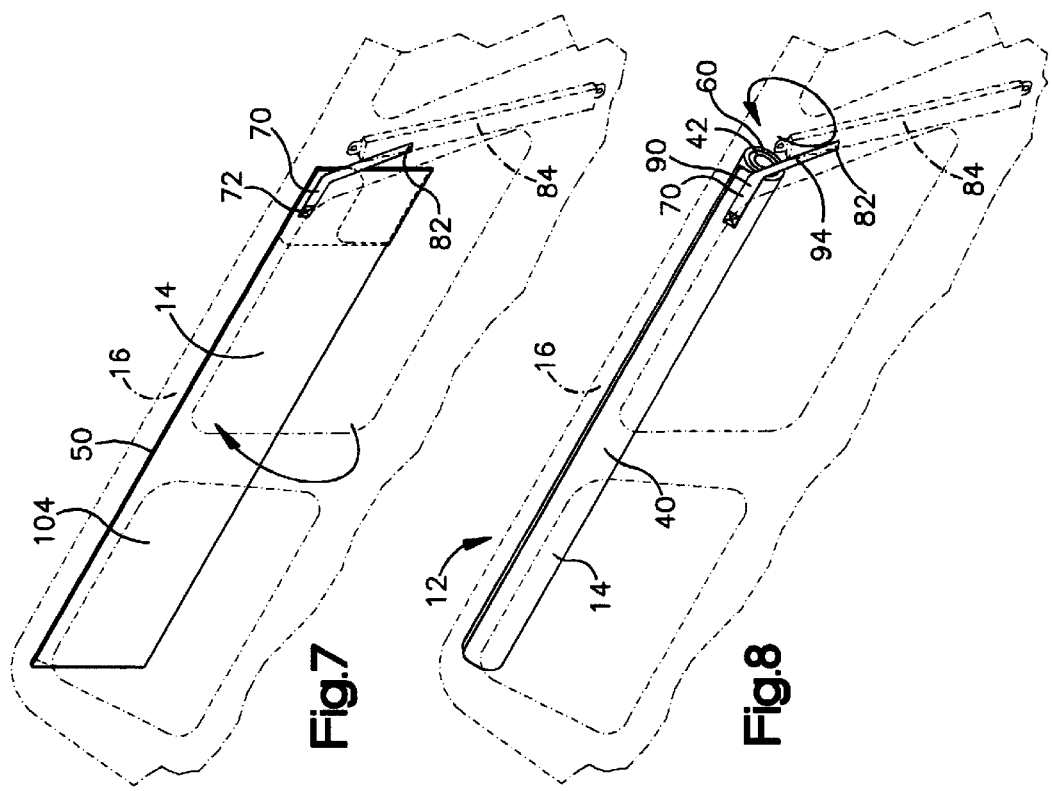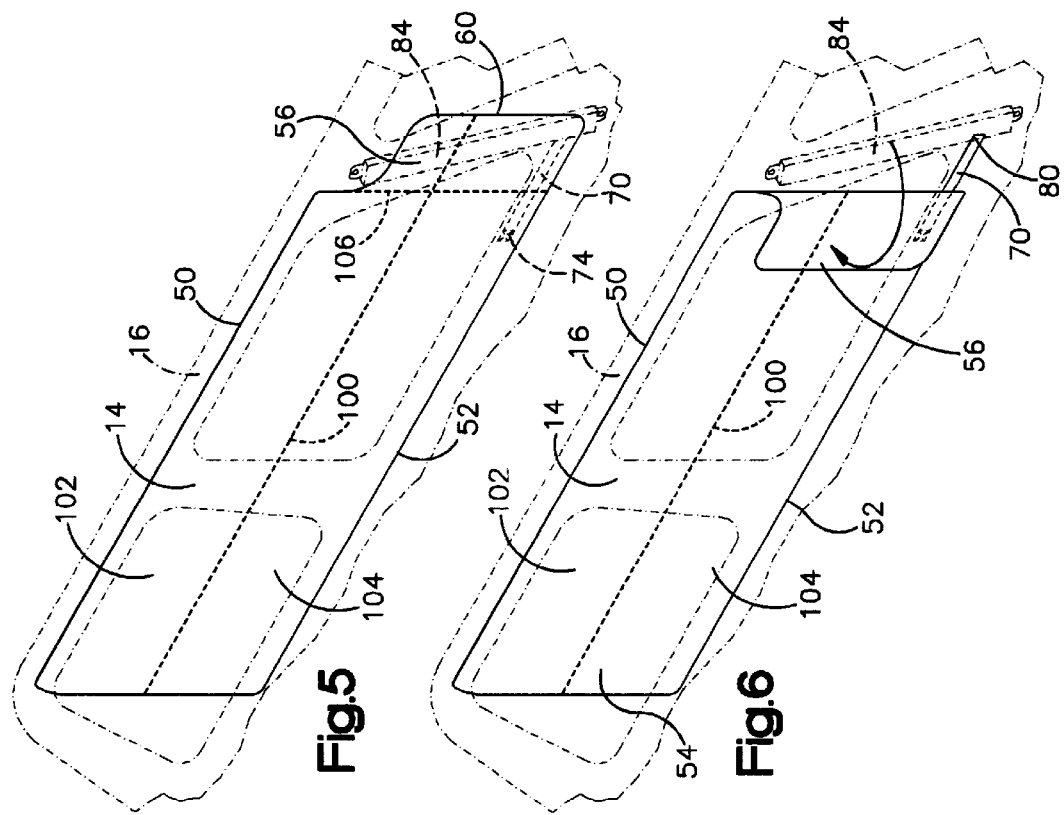

FOLDED INFLATABLE SIDE CURTAIN WITH TETHER

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus comprises an inflatable vehicle occupant protection device that is inflatable away from the vehicle roof into a position between the side structure of the vehicle and a vehicle occupant. The inflatable vehicle occupant protection device, when inflated, has a perimeter at least partially defined by an upper edge, a lower edge, and front and rear portions spaced apart horizontally along the upper and lower edges. An inflation fluid source provides inflation fluid for inflating the inflatable vehicle occupant protection device.

A flexible elongated member has a first end connected to the inflatable vehicle occupant protection device at a first location spaced away from the upper edge on the inflatable vehicle occupant protection device and an opposite second end connected to the vehicle side structure at a second location. The inflatable vehicle occupant protection device, prior to Inflation, is folded along a first line such that a lower portion of the inflatable vehicle occupant protection device overlies an upper portion of the inflatable vehicle occupant protection device and such that the first end of the flexible elongated member is positioned adjacent the upper edge of the inflatable vehicle occupant protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 4–8 are schematic views of the apparatus of FIGS. 1 and 2 illustrating the apparatus in different positions.

DESCRIPTION OF PREFERRED EMBODIMENTS

Figures 1, 2:
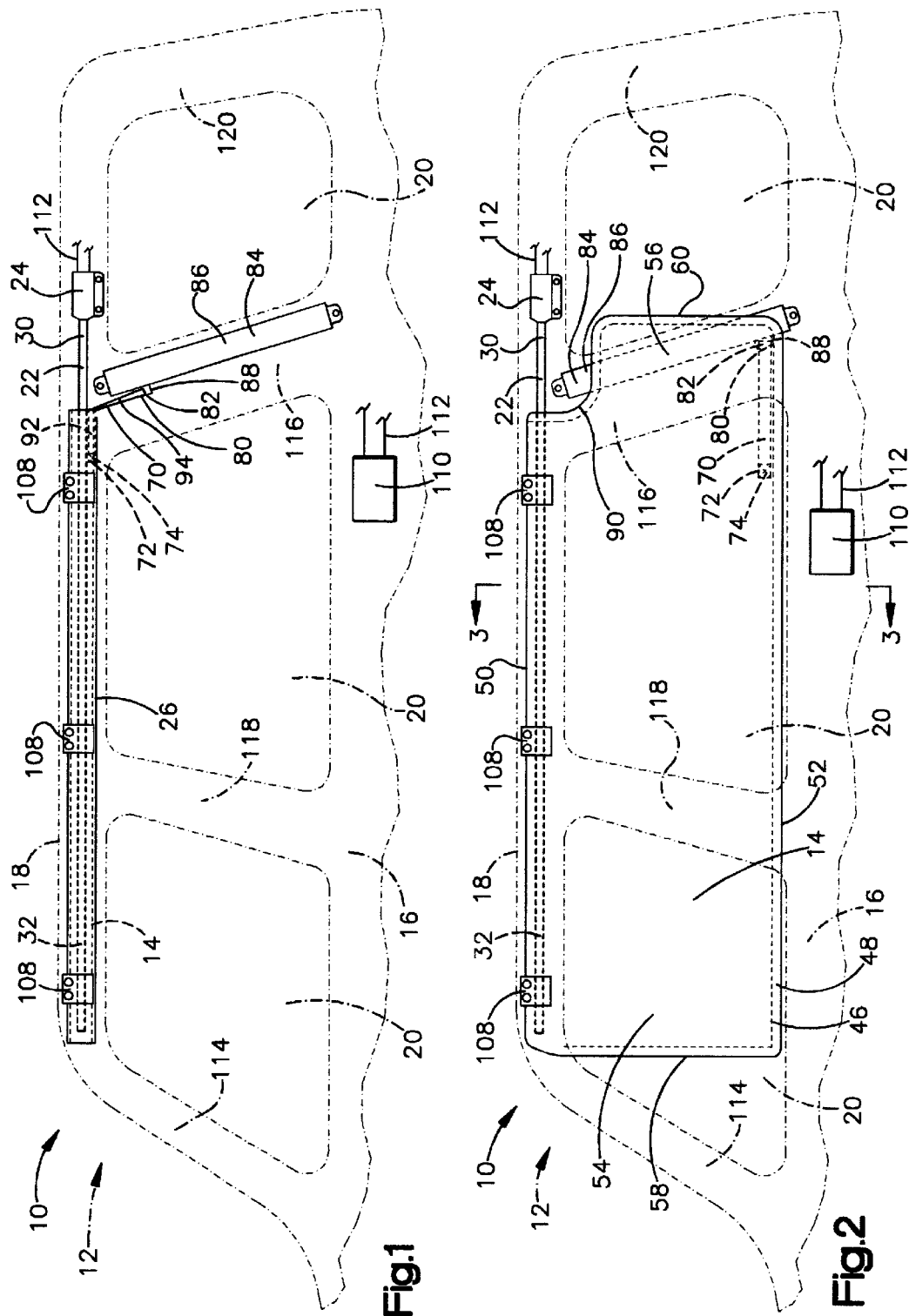
FIG. 1 is a schematic view of an inflatable apparatus for helping to protect a vehicle occupant illustrating the apparatus in a deflated condition.
FIG. 2 is a schematic view of the apparatus of FIG. 1 in an inflated condition.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first portion 30 for receiving fluid from the inflator 24. The fill tube 22 has a second portion 32 disposed in the inflatable curtain 14. The fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and the housing 26 have an elongated configuration and extend along the vehicle roof 18 and along the side structure 16 of the vehicle 12 above the side windows 20.

Figure 3:
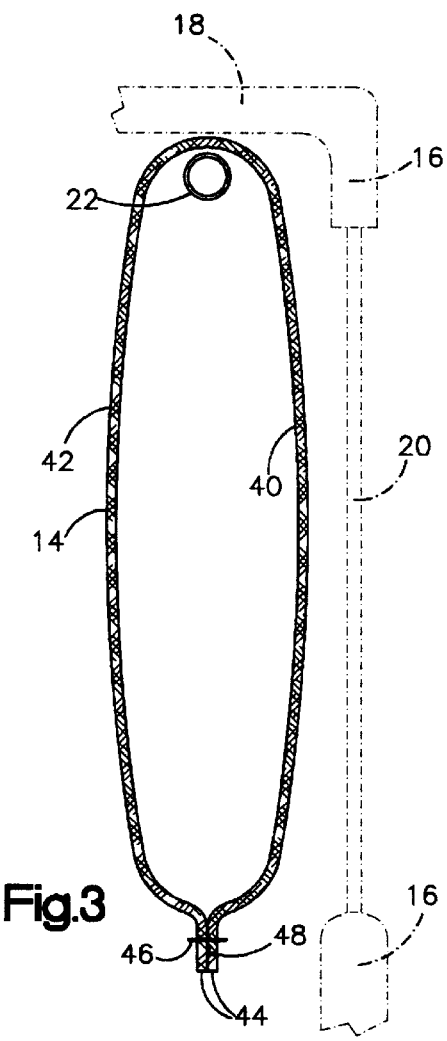
FIG. 3 is a sectional view of the apparatus taken generally along line 3—3 in FIG. 2.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along the perimeter 48 of the panels. The perimeter 48 is defined at least partially by an upper edge 50 (FIG. 2) of the inflatable curtain 14, an opposite lower edge 52 of the curtain, and front and rear portions 54 and 56, respectively, of the curtain spaced apart horizontally along the upper and lower edges.

In the embodiment illustrated in FIG. 2, the front and rear portions 54 and 56 of the inflatable curtain 14 are at least partially defined by front and rear edges 58 and 60, respectively, that are spaced horizontally apart along the upper and lower edges 50 and 52 and extend generally vertically between the upper and lower edges. The front and rear edges 58 and 60 could, however, be omitted and the upper edge 50 and/or the lower edge 52 could be curved and extended until the upper and lower edges intersect, in which case the front and rear portions 54 and 56 would be defined by the intersecting upper and lower edges. Also, while the front and rear edges 58 and 60 are illustrated as being generally vertical, they could extend at some other angle between the upper and lower edges 50 and 52.

As illustrated in FIG. 3, the inflatable curtain 14 is formed from a sheet of material that is folded over to form the overlying first and second panels 40 and 42. It will be recognized by those skilled in the art, however, that the inflatable curtain 14 could have alternative constructions.

For example, the first and second panels 40 and 42 could be formed from separate sheets of material arranged in an overlying manner and secured together by stitching 46 that extends around the entire perimeter 48 of the panels to form the inflatable curtain 14. The first and second panels 40 and 42 may also be woven together around their perimeters to form the inflatable curtain 14.

The first and second panels 40 and 42 are constructed of a fabric, such as nylon, that is coated with a gas impermeable material, such as urethane or silicone. The inflatable curtain 14 thus may have a substantially air-tight construction. Other materials, such as elastomers, plastic films, or combinations thereof, may also be used to construct the inflatable curtain 14. The first and second panels 40 and 42 may also be formed of single or multi-layered sheets of material.

The apparatus 10 includes a flexible elongated member in the form of a tether 70 that connects the inflatable curtain 14 to the vehicle side structure 16. The tether 70 includes a first end 72 connected to the inflatable curtain 14 at a first location 74 on the curtain and an opposite second end 80 connected to the vehicle side structure 16 at a second location 82. As illustrated FIGS. 1 and 2, the second location 82 may be on a slider assembly 84 connected to the vehicle side structure 16. The slider assembly 84 includes a track 86 and an element 88 that is movable along the track. The second end 80 of the tether 70 is connected to the element 88.

When the inflatable curtain 14 is in the inflated condition of FIG. 2, the rear portion 56 of the curtain may overlie a portion of the slider assembly 84. As illustrated in FIG. 2, the rear portion 56 of the inflatable curtain 14 may include a curved portion 90. The curved portion 90 may help to prevent the rear portion 56 of the inflatable curtain 14 from interfering with or becoming caught in the slider assembly 84 when the curtain is inflated.

Those skilled in the art will recognize that it may be desirable to limit the amount of slack in the tether 70 when the inflatable curtain 14 is inflated in order to help maintain the position of the curtain during a side impact or vehicle rollover. It may also be desirable to tension the tether 70 when the inflatable curtain 14 is inflated. Thus, the tether 70 may have a predetermined length in order to reduce the amount of slack in the tether or tension the tether when the inflatable curtain 14 is inflated.

When the inflatable curtain 14 is in the deflated condition of FIG. 1, the curtain is folded and rolled up into the stored position in the housing 26. When the inflatable curtain 14 is in the stored condition, a first portion 92 of the tether 70 is stored in the housing 26 and a second portion 94 of the tether extends from the housing to the second location 82. According to the present invention, the inflatable curtain 14 is folded and rolled up into the stored position in a manner such that the tether 70 may have a desired predetermined length.

It will be recognized by those skilled in the art that the tether 70 must be of a length sufficient to extend from the first location 74 to the second location 82 when the inflatable curtain 14 is in the stored position. According to the present invention, when the inflatable curtain 14 is folded and rolled up into the stored condition, the first portion 92 of the tether 70 extends along a generally straight line from the first location 74 to the rear extent of the folded and rolled up curtain. The second portion 94 of the tether 70 extends along a generally straight line from the rear extent of the folded and rolled up inflatable curtain 14 to the second location 82. This helps to allow the tether to have the desired predetermined length.

Figure 4:
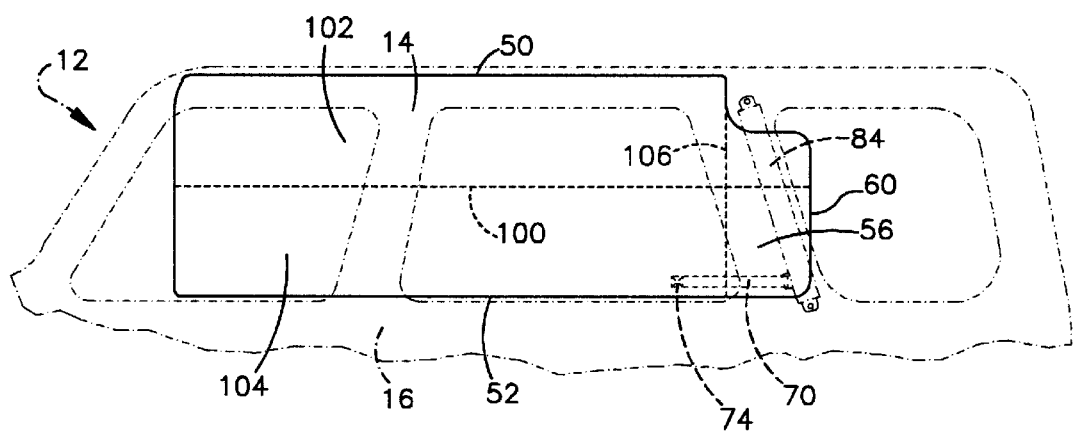

As illustrated in FIGS. 4 and 5, the tether 70 is positioned such that the first location 74 is spaced away from the upper edge 50 and the rear edge 60 of the inflatable curtain 14. The tether 70 is also positioned such that the first location 74 is positioned adjacent the lower edge 52 of the inflatable curtain 14. The first location 74 is on the first panel (not shown in FIGS. 4 and 5) of the inflatable curtain 14, between the curtain and the vehicle side structure 16. A first fold line 100 defines upper and lower portions 102 and 104, respectively, of the inflatable curtain 14. The upper portion 102 extends between the first fold line 100 and the upper edge 50 of the inflatable curtain 14. The lower portion 104 extends between the first fold line 100 and the lower edge 52 of the inflatable curtain 14.

It may be desirable to fold the rear portion 56 away from the slider assembly 84 in order to help prevent the rear portion of the inflatable curtain 14 from interfering with or becoming caught in the slider assembly when the curtain is inflated. Thus, the inflatable curtain 14 may be initially folded along a generally vertical rear fold line 106 into the position illustrated in FIG. 6. The inflatable curtain 14 is folded in the direction indicated generally by the arrow in FIG. 6 such that the rear portion 56 of the curtain is spaced away from both the slider assembly 84 and the second end 80 of the tether 70 where the tether is connected to the slider assembly 84.

After the inflatable curtain 14 is in the position of FIG. 6, the inflatable curtain 14 is folded along the first fold line 100 into the position illustrated in FIG. 7. The inflatable curtain 14 is folded in the direction indicated generally by the arrow in FIG. 7, away from the vehicle side structure 16, such that the lower portion 104 of the curtain overlies the upper portion (not shown in FIG. 7) of the curtain and the first end 72 of the tether 70 is positioned adjacent the upper edge 50 of the curtain. When the inflatable curtain 14 is in the position illustrated in FIG. 7, the curtain is positioned between the tether 70 and the vehicle side structure 16.

When the inflatable curtain 14 is in the position of FIG. 7, the inflatable curtain 14 is then rolled up into the position illustrated in FIG. 8. The inflatable curtain 14 is rolled up in the direction indicated generally by the arrow in FIG. 8. As illustrated in FIG. 8, the inflatable curtain 14 is rolled up in a direction outward toward the vehicle side structure 16. Thus, when the inflatable curtain 14 is in the stored position, the first panel 40 faces outwardly of the curtain and the second panel 42 faces inwardly of the curtain.

When the inflatable curtain 14 is in the folded and rolled up condition illustrated in FIG. 8, the fill tube 22 (FIG. 1) is inserted into the inflatable curtain 14. The fill tube 22 may also be inserted into the inflatable curtain 14 prior to folding and rolling up the curtain. The inflatable curtain 14, fill tube, and tether 70 are then placed in the housing 26 and connected to the vehicle 12 by known means, such as brackets 108. The second end 80 of the tether 70 is then connected to the element 88.

As illustrated in FIG. 8, when the inflatable curtain 14 is in the folded and rolled up condition, the tether 70 is generally free from interference from the curtain. This helps to allow the tether 70 to be moved or adjusted when placing the curtain in the stored position in the vehicle 12. This also allows the tether 70 to be positioned such that the first portion 92 extends along a generally straight line from the first location 74 to the rear extent of the folded and rolled up inflatable curtain 14. The second portion 94 extends along a generally straight line from the rear extent of the folded and rolled up inflatable curtain 14 to the second location 82.

The vehicle 12 includes a sensor mechanism 110 (shown schematically in FIGS. 1 and 2) for sensing a side impact to the vehicle 12 and/or a rollover of the vehicle 12. The sensor mechanism 110 actuates the inflator 24 in response to the sensing of a side impact or a vehicle rollover.

In the event of a rollover of the vehicle 12 or a side impact to the vehicle of a magnitude greater than a predetermined threshold value, the sensor mechanism 110 provides an electrical signal over lead wires 112 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

When the housing 26 (FIG. 1) opens and the inflatable curtain 14 begins to inflate, the curtain begins to unroll in a direction generally opposite the arrow in FIG. 8 towards the unrolled position of FIG. 7. As the inflatable curtain 14 continues to inflate, the curtain begins to unfold along the first fold line 100 in a direction generally opposite the arrow in FIG. 7 toward the position of FIG. 6. The rear portion 56 of the inflatable curtain 14 then begins to unfold along the rear fold line 106 in a direction generally opposite the arrow in FIG. 6 toward the position of FIG. 5.

Although the inflation of the inflatable curtain 14 is described in the above paragraph as taking place in a series of steps, it will be recognized by those skilled in the art that there may be some overlap between the steps as the curtain is inflated. For example, the lower portion 104 of the inflatable curtain 14 may begin to unfold away from the upper portion 102 before the curtain is completely unrolled. Also, the rear portion 56 may begin to unfold before the lower portion 104 is completely unfolded from the upper portion 102.

As the inflatable curtain 14 moves from the position in FIG. 7 towards the position in FIG. 6, the inflating curtain moves the tether 70 and the element 88 downward along the track 86 towards the position illustrated in FIG. 2. It will be recognized by those skilled in the art that the slider assembly 84 may include separate means, such as a piston or a spring, for moving the element 88 downward along the track 86. As the element 88 moves downward along the track 86, movement of the element in an opposite direction may be blocked by known means (not shown), such as a latch or ratchet.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 of the inflatable curtain 14 is positioned adjacent the intersection of the roof 18 and the side structure 16 of the vehicle 12. The front edge 58 of the inflatable curtain 14 is positioned adjacent an A pillar 114 of the vehicle 12. The rear edge 60 of the inflatable curtain 14 is positioned adjacent a C pillar 116 of the vehicle 12. The inflatable curtain 14 extends between the A pillar 114 and the C pillar 116 of the vehicle 12 and overlies at least a portion of the A pillar, C pillar, and a B pillar 118 of the vehicle.

It will be recognized by those skilled in the art that the inflatable curtain may have alternative configurations. For example, in the illustrated embodiment, the inflatable curtain 14 extends between the A pillar 114 and the C pillar 116 of the vehicle 12. The inflatable curtain 14 could, however, extend between the A pillar 114 and the B pillar 118 only or between the B pillar and the C pillar 116 only. Also, the inflatable curtain 14 could, when inflated, extend between the A pillar and a D pillar 120 of the vehicle 12.

The inflatable curtain 14, when inflated, helps to protect a vehicle occupant in the event of a vehicle rollover or a side impact to the vehicle 12. The inflatable curtain 14, when inflated, helps to absorb the energy of impacts with the inflatable curtain 14 and helps to distribute the impact energy over a large area of the curtain. The tether 70 helps to maintain the inflatable curtain 14 positioned between the vehicle side structure 16 and any vehicle occupant. Depending upon the predetermined length of the tether 70, the tether may be tensioned when the inflatable curtain 14 is inflated.

A second embodiment of the present invention is illustrated in FIGS. 9–14. The second embodiment of the invention is similar to the first embodiment of the invention illustrated in FIGS. 1–8. Accordingly, numerals similar to those of FIGS. 1–8 will be utilized in FIGS. 9–14 to identify similar components, the suffix letter "a" being associated with the numerals of FIGS. 9–14 to avoid confusion. The inflatable curtain 14a (FIGS. 9–14) of the second embodiment is identical to the inflatable curtain 14 (FIGS. 1–8), except that the first location 74a (FIGS. 9–14) has a different position on the inflatable curtain 14a than the first location 74 (FIGS. 1–8) of the first embodiment. The inflatable curtain 14a (FIGS. 9–14) of the second embodiment is also folded and rolled up in a manner different from that of the inflatable curtain 14 (FIGS. 1–8) of the first embodiment.

Figure 9:
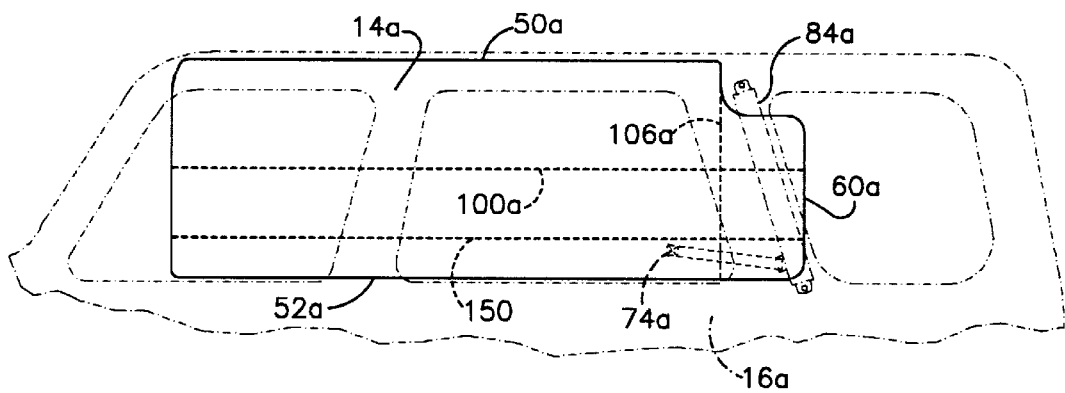
FIGS. 9–14 are schematic views of an apparatus for helping to protect a vehicle occupant illustrating the apparatus in different positions according to a second embodiment of the invention.
Figure 10:
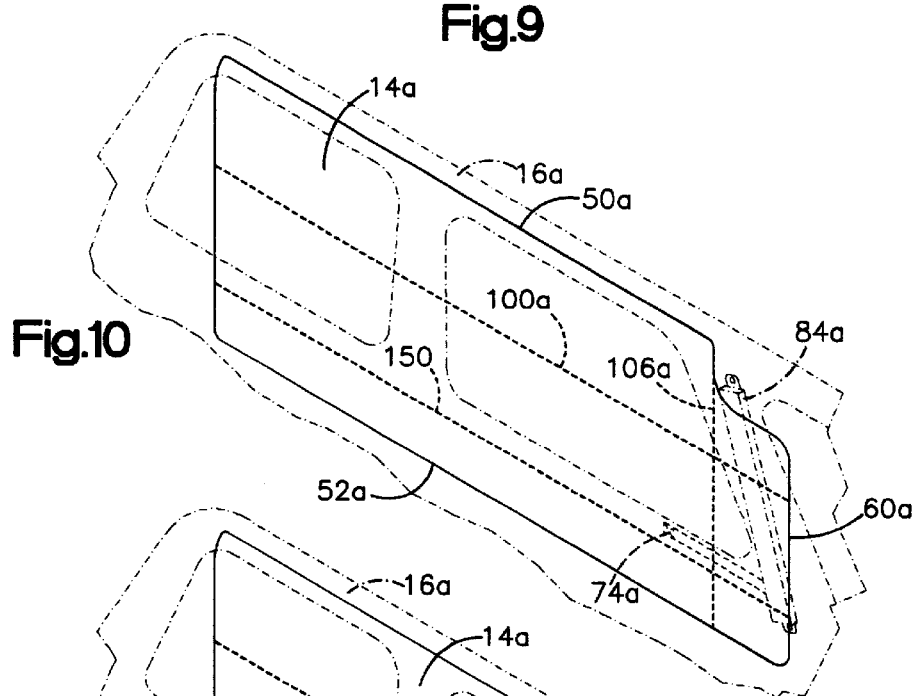

In the embodiment illustrated in FIGS. 9 and 10, the first location 74a is spaced away from the upper edge 50a, the lower edge 52a, and the rear edge 60a of the inflatable curtain 14a. The first location 74a is on the first panel (not shown in FIGS. 9 and 10) of the inflatable curtain 14a, between the curtain and the vehicle side structure 16a. The inflatable curtain 14a of the second embodiment includes a second fold line 150 that extends adjacent to the first location 74a, between the first location and the lower edge 52a of the curtain.

Figure 11:
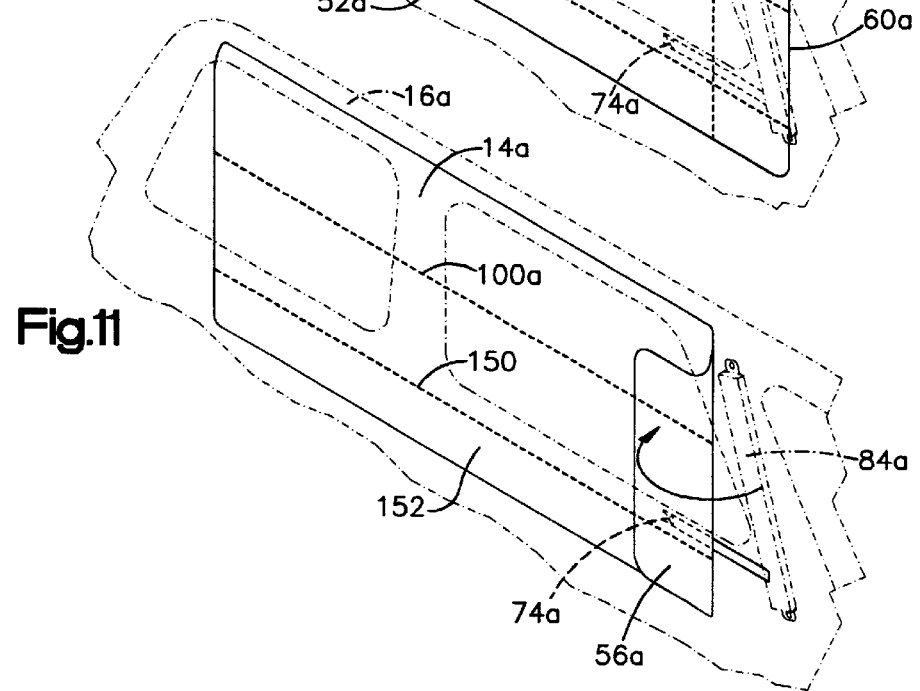

The inflatable curtain 14a may be initially folded along the rear fold line 106a into the position illustrated in FIG. 11. The inflatable curtain 14a is folded in the direction indicated generally by the arrow in FIG. 11 such that the rear portion 56a of the curtain is spaced away from the slider assembly 84a.

Figure 12:
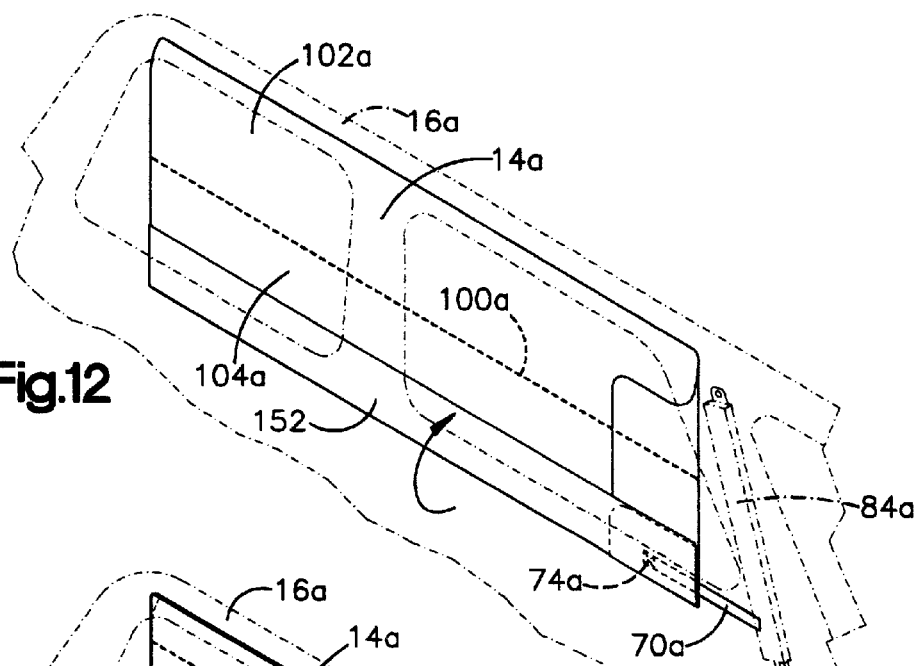

After the inflatable curtain 14 is in the position of FIG. 11, a portion 152 of the lower portion 104a of the inflatable curtain 14a is folded over along the second fold line 150 into the position illustrated in FIG. 12. The portion 152, when folded over, overlies the remainder of the lower portion 104a of the inflatable curtain 14a. The inflatable curtain 14a is folded in the direction indicated generally by the arrow in FIG. 12, away from the vehicle side structure 16a. It should be noted that the tether 70a remains positioned between the inflatable curtain 14a and the vehicle side structure 16a when the portion 152 is folded over.

Figure 13:
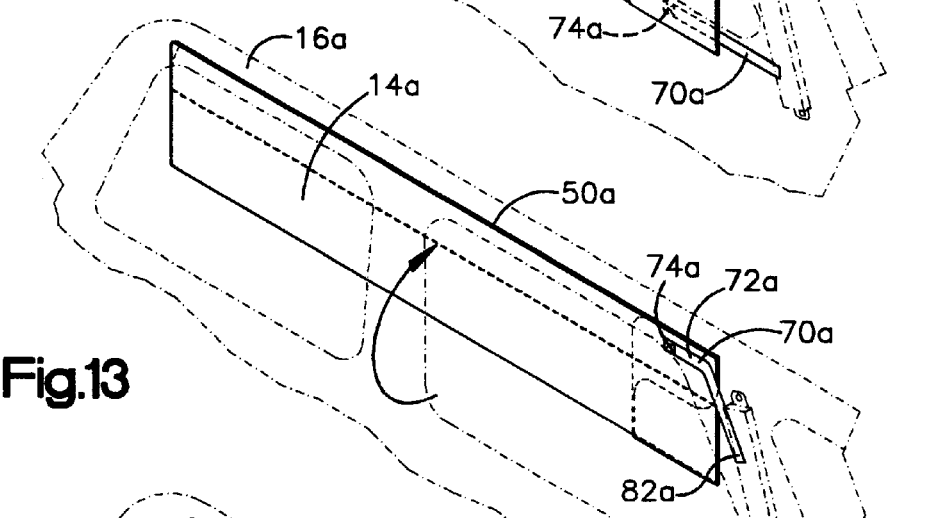

When the inflatable curtain 14 is in the position of FIG. 12, the inflatable curtain 14a is then folded along the first fold line 100a into the position illustrated in FIG. 13. The inflatable curtain 14a is folded in the direction indicated generally by the arrow in FIG. 13, away from the vehicle side structure 16a, such that the lower portion 104a of the curtain overlies the upper portion (not shown in FIG. 13) of the curtain. The first end 72a of the tether 70a is positioned adjacent the upper edge 50a of the curtain. When the inflatable curtain 14a is in the position illustrated in FIG. 13, the curtain is positioned between the tether 70a and the vehicle side structure 16a.

Figure 14:
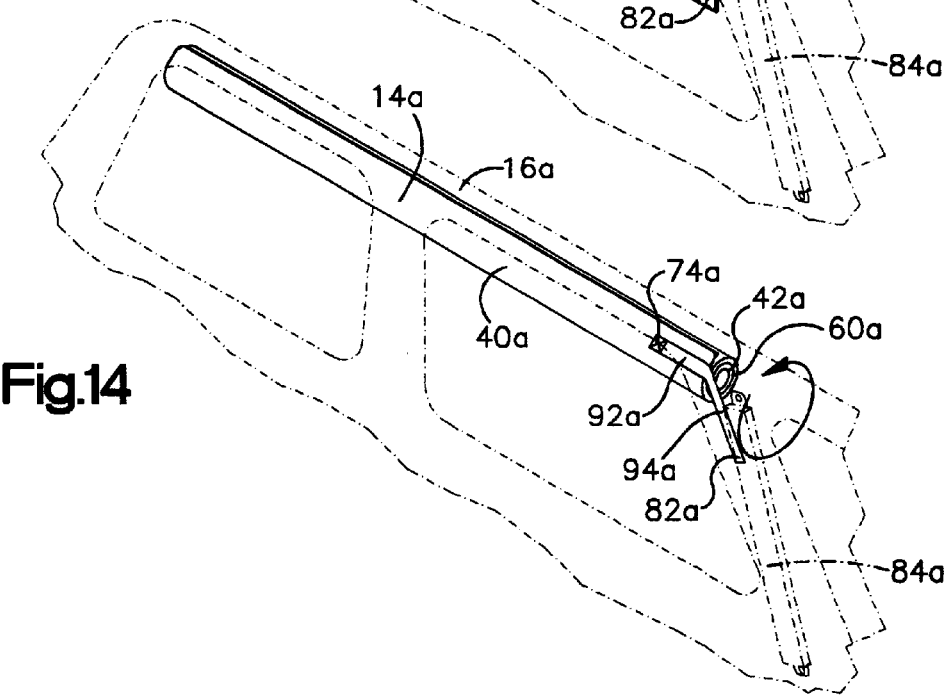

After the inflatable curtain 14 is in the position of FIG. 13, the inflatable curtain 14a is rolled up into the position illustrated in FIG. 14. The inflatable curtain 14a is rolled up in the direction indicated generally by the arrow in FIG. 14. As illustrated in FIG. 14, the inflatable curtain 14a is rolled up in a direction outward toward the vehicle side structure 16a. Thus, when the inflatable curtain 14a is rolled up in the stored position, the first panel 40a faces outwardly of the curtain and the second panel 42a faces inwardly of the curtain.

As illustrated in FIG. 14, when the inflatable curtain 14a is in the folded and rolled up condition, the tether 70a is generally free from interference from the curtain. This helps to allow the tether 70a to be moved or adjusted when placing the curtain in the stored position in the vehicle 12a. This also allows the tether 70a to be positioned such that the first portion 92a extends along a generally straight line from the first location 74a to the rear extent of the folded and rolled up inflatable curtain 14a. The second portion 94a extends along a generally straight line from the rear extent of the folded and rolled up inflatable curtain 14a to the second location 82a.

When the inflatable curtain 14a begins to inflate, the curtain begins to unroll in a direction generally opposite the arrow in FIG. 14 towards the unrolled position of FIG. 13. As the inflatable curtain 14a continues to inflate, the curtain begins to unfold along the first fold line 100a in a direction generally opposite the arrow in FIG. 13 toward the position of FIG. 12. The inflatable curtain 14a then begins to unfold along the second fold line 150 in a direction generally opposite the arrow in FIG. 12 toward the position of FIG. 11. The inflatable curtain 14a then begins to unfold along the rear fold line 106a in a direction generally opposite the arrow in FIG. 11 toward the position of FIG. 10.

The inflatable curtain 14a, when inflated, extends along the side structure 16a of the vehicle 12a and is positioned between the side structure and any occupant of the vehicle. The inflatable curtain 14a, when inflated, helps to protect a vehicle occupant in the event of a vehicle rollover or a side impact to the vehicle 12a. The inflatable curtain 14a, when inflated, helps to absorb the energy of impacts with the inflatable curtain and help to distribute the impact energy over a large area of the curtain.

From the above description of the invention, those skilled in the art will perceive improvements, changes and modifications. For example, in the illustrated embodiments, the inflatable curtain is folded in a direction away from the vehicle side structure along the fold lines and rolled up in a direction towards the vehicle side structure. The inflatable curtain could, however, be folded towards the vehicle side structure and rolled up away from the vehicle side structure. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device having a perimeter at least partially defined by upper and lower edges of said inflatable vehicle occupant protection device and front and rear portions of said inflatable vehicle occupant protection device spaced apart along said upper and lower edges, a first fold line extending generally horizontally along the length of said inflatable vehicle occupant protection device between said upper and lower edges, said inflatable vehicle occupant protection device including an upper portion extending between said upper edge and said first fold line and a lower portion extending between said lower edge and said first fold line;

an inflation fluid source that provides inflation fluid for inflating said inflatable vehicle occupant protection device;

a slider assembly connected to the vehicle side structure, said slider assembly including a track extending generally vertically in the vehicle and an element that is slidable along said track; and a flexible elongated member having a first end connected to said inflatable vehicle occupant protection device at a first location on said lower portion of said inflatable vehicle occupant protection device and an opposite second end connected to said element;

said inflatable vehicle occupant protection device prior to inflation being folded along said first fold line such that said lower portion overlies said upper portion and such that said first location is positioned adjacent said upper edge of said inflatable vehicle occupant protection device.

2. Apparatus as defined in claim 1, wherein said inflatable vehicle occupant protection device is an inflatable curtain having a stored position prior to inflation extending along the vehicle side structure adjacent the vehicle roof, said inflatable curtain being inflated away from the vehicle roof into said position between the side structure of the vehicle and a vehicle occupant.

3. Apparatus as defined in claim 2 wherein said inflatable curtain comprises overlying first and second panels that are interconnected along at least a portion of said perimeter, said first panel being positioned adjacent the vehicle side structure when said inflatable curtain is inflated.

4. Apparatus as defined in claim 3, wherein said inflatable curtain is folded along said first fold line and then rolled up into said stored position.

5. Apparatus as defined in claim 4, wherein said first panel faces outwardly of said inflatable curtain and said second panel faces inwardly of said inflatable curtain when said inflatable curtain is rolled up in said stored position.

6. Apparatus as defined in claim 3, wherein said first location is adjacent said lower edge of said inflatable curtain and on said first panel in said lower portion of said inflatable curtain, said upper portion being located between said lower portion and the vehicle side structure when said inflatable curtain is folded along said first line.

7. Apparatus as defined in claim 3, wherein said first location is spaced away from said lower edge of said inflatable curtain and on said first panel in said lower portion of said inflatable curtain, a portion of said lower portion being folded over along a second fold line before said inflatable curtain is folded along said first fold line, said second fold line extending generally parallel to said first fold line between said lower edge and said first location, said portion of said lower portion when folded over along said second fold line being positioned adjacent said second panel and overlying said second panel, said upper portion being located between said lower portion and the vehicle side structure when said inflatable curtain is folded along said first fold line.

8. Apparatus as defined in claim 2, wherein said front portion of said inflatable curtain is at least partially defined by a front edge of said inflatable curtain extending between said upper edge and said lower edge, and said rear portion of said inflatable curtain is at least partially defined by a rear edge of said inflatable curtain extending between said upper edge and said lower edge.

9. Apparatus as defined in claim 8, wherein said flexible elongated member has a first portion extending along a generally straight line from said first location to a rear extent of said inflatable curtain and a second portion extending along a generally straight line from said rear extent of said inflatable curtain to said second location when said inflatable curtain is in said stored position.

10. Apparatus as defined in claim 8, wherein said inflatable curtain is folded along a rear fold line that is spaced away from said rear edge and extends generally perpendicular to said first fold line prior to folding said inflatable curtain along said first fold line.

11. Apparatus as defined in claim 1, wherein said second location is on a C pillar of the vehicle.

12. Apparatus as defined in claim 1, wherein said element is slidable along said track when said inflatable vehicle occupant protection device is inflated.

13. Apparatus as defined in claim 12, wherein said slider assembly is connected to a C pillar of the vehicle.

14. Apparatus as defined in claim 2, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

15. Apparatus as defined in claim 2, wherein said inflatable curtain when inflated extends along the side structure of the vehicle between an A pillar and a C pillar of the vehicle.

16. Apparatus as defined in claim 2, wherein said inflatable curtain, when inflated, overlies at least a portion of an A pillar, a 3 pillar and a C pillar of the vehicle.

17. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

18. Apparatus as defined in claim 1, wherein said inflation fluid source comprises an inflator which is actuatable to inflate said inflatable vehicle occupant protection device.

19. Apparatus as defined in claim 1, wherein said first location is positioned near an upper end of said track when said inflatable vehicle occupant protection device is folded along said first fold line.

20. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device comprising overlying first and second panels, said first panel being positioned adjacent the vehicle side structure when said inflatable vehicle occupant protection device is inflated, said inflatable vehicle occupant protection device having a perimeter at least partially defined by upper and lower edges of said inflatable vehicle occupant protection device, a first fold line extending generally horizontally along the length of said inflatable vehicle occupant protection device between said upper and lower edges, said inflatable vehicle occupant protection device including an upper portion extending between said upper edge and said first fold line and a lower portion extending between said lower edge and said first fold line;

an inflation fluid source that provides inflation fluid for inflating said inflatable vehicle occupant protection device;

a slider assembly connected to the vehicle side structure, said slider assembly including a track extending generally vertically in the vehicle and an element that is slidable along said track; and a flexible elongated member having a first end connected to said inflatable vehicle occupant protection device at a first location on said first panel on said lower portion of said inflatable vehicle occupant protection device and an opposite second end connected to said element;

said inflatable vehicle occupant protection device prior to inflation folded along said first fold line such that said lower portion overlies said upper portion and such that said first location is positioned adjacent said upper edge of said inflatable vehicle occupant protection device and near an upper end of said track, said first and second panels being positioned between said flexible elongated member and the vehicle side structure when said inflatable curtain is folded along said first fold line.

21. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device comprising overlying first and second panels, said first panel being positioned adjacent the vehicle side structure when said inflatable vehicle occupant protection device is inflated, said inflatable vehicle occupant protection device having a perimeter at least partially defined by upper and lower edges of said inflatable vehicle occupant protection device and front and rear portions of said inflatable vehicle occupant protection device spaced apart along said upper and lower edges, a first fold line extending generally horizontally along the length of said inflatable vehicle occupant protection device between said upper and lower edges, said inflatable vehicle occupant protection device including an upper portion extending between said upper edge and said first fold line and a lower portion extending between said lower edge and said first fold line, a second fold line extending generally parallel to said first fold line on said lower portion of said inflatable vehicle occupant protection device;

an inflation fluid source that provides inflation fluid for inflating said inflatable vehicle occupant protection device;

a slider assembly connected to the vehicle side structure, said slider assembly including a track extending generally vertically in the vehicle and an element that is slidable along said track; and a flexible elongated member having a first end connected to said inflatable vehicle occupant protection device at a first location spaced away from said lower edge on said lower portion of said inflatable vehicle occupant protection device and an opposite second end connected to said element;

said lower portion prior to inflation of said inflatable vehicle occupant protection device being folded over along said second fold line such that a portion of said lower portion is positioned adjacent said second panel and overlying said second panel, said inflatable vehicle occupant protection device being folded along said first fold line such that said lower portion overlies said upper portion and such that said first location is positioned adjacent said upper edge of said inflatable vehicle occupant protection device, said upper portion being located between said lower portion and the vehicle side structure when said inflatable curtain is folded along said first fold line.

22. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device having a perimeter at least partially defined by upper and lower edges of said inflatable vehicle occupant protection device and front and rear portions of said inflatable vehicle occupant protection device spaced apart along said upper and lower edges, said rear portion being at least partially defined by a rear edge of said inflatable vehicle occupant protection device extending between said upper edge and said lower edge, a first fold line extending generally horizontally along the length of said inflatable vehicle occupant protection device between said upper and lower edges, said inflatable vehicle occupant protection device including an upper portion extending between said upper edge and said first fold line and a lower portion extending between said lower edge and said first fold line, a rear fold line being spaced away from said rear edge and extending generally perpendicular to said first fold line;

an inflation fluid source that provides inflation fluid for inflating said inflatable vehicle occupant protection device;

a slider assembly connected to the vehicle side structure, said slider assembly including a track extending generally vertically in the vehicle and an element that is slidable along said track; and a flexible elongated member having a first end connected to said inflatable vehicle occupant protection device at a first location on said lower portion of said inflatable vehicle occupant protection device and an opposite second end connected to said element;

said inflatable vehicle occupant protection device prior to inflation being folded along said rear fold line and being folded along said first fold line such that said lower portion overlies said upper portion and such that said first location is positioned adjacent said upper edge of said inflatable vehicle occupant protection device.

* * * * *

UNITED STATES PATENT AND TRADEMARK OFFICE
CERTIFICATE OF CORRECTION

PATENT NO.    : 6,361,068 B1
DATED         : March 26, 2002
INVENTOR(S)   : Russell E. Stein and Ayad G. Nayef It is certified that error appears in the above-identified patent and that said Letters Patent is hereby corrected as shown below:

Column 9,
Line 42, after "a" (first occurrence), change "3" to -- B --.

Signed and Sealed this

Fourteenth Day of January, 2003

JAMES E. ROGAN
*Director of the United States Patent and Trademark Office*